(12) United States Patent
Mullin

(10) Patent No.: US 9,525,558 B1
(45) Date of Patent: Dec. 20, 2016

(54) COAXIAL CABLE OR TRANSMISSION MEDIUM CLASSIFICATION SYSTEM, CIRCUIT AND METHOD

(71) Applicant: Transition Networks, Inc., Minnetonka, MN (US)

(72) Inventor: Jeffrey Doyle Mullin, Elk River, MN (US)

(73) Assignee: Transition Network, Inc., Minnetonka, MN (US)

( * ) Notice: Subject to any disclaimer, the term of this patent is extended or adjusted under 35 U.S.C. 154(b) by 0 days.

(21) Appl. No.: 15/041,631

(22) Filed: Feb. 11, 2016

(51) Int. Cl.
*H04L 25/00* (2006.01)
*H04L 12/10* (2006.01)
*H04B 3/54* (2006.01)

(52) U.S. Cl.
CPC ............... *H04L 12/10* (2013.01); *H04B 3/54* (2013.01)

(58) Field of Classification Search
CPC . H04L 25/0272; H04L 25/0292; H02H 9/045; H02H 9/04
USPC ........... 375/257, 256; 361/56; 363/20.01, 41
See application file for complete search history.

(56) References Cited

U.S. PATENT DOCUMENTS

| 2014/0036400 A1* | 2/2014 | Zhou | H04L 12/10 361/56 |
| 2015/0066231 A1* | 3/2015 | Clifton | G05F 1/66 700/296 |
| 2016/0172990 A1* | 6/2016 | Barker | H02M 1/32 363/35 |

* cited by examiner

*Primary Examiner* — Khai Tran
(74) *Attorney, Agent, or Firm* — John D. Veldhuis-Kroeze; Westman, Champlin & Koehler, P.A.

(57) ABSTRACT

Remote devices are classified or identified as devices configured to be powered by power injected onto a transmission medium such as a coaxial cable. From a local position, local classification circuitry applies a first low voltage DC signal to the transmission medium. Energy from the first DC signal is received by remote classification circuitry at the remote position of a remote device, and stored within an energy storage component. Using the stored energy, the remote classification circuitry generates a digital classification signal on the coax cable or transmission medium. Upon receipt of the digital classification signal at the local end, the local classification circuitry responsively applies a second higher voltage DC signal to the transmission medium. The second DC signal is received at the remote end and used in providing power to the remote device.

18 Claims, 5 Drawing Sheets

COAXIAL CABLE OR TRANSMISSION MEDIUM CLASSIFICATION SYSTEM, CIRCUIT AND METHOD

BACKGROUND OF THE INVENTION

The present invention relates to systems which provide power over a communication or transmission line or medium, such as over coaxial cable, to remotely located equipment and devices.

Increasingly, remote devices are being provided with the ability to be accessed virtually. For example, security cameras are migrating from black and white closed circuit analog devices to digital devices with connectivity to the World Wide Web. It is cost advantageous to continue to use the installed infrastructure of coaxial cable for the new digital cameras. In addition to sending of digital data full duplex over the coaxial cable it is also advantageous to send power over the cable from the data collection side (local) to the camera (remote). This power can then be used in place of mains alternating current (AC) power for powering the camera. This allows more flexibility for the installer to move the camera without the need for an electrician to also move or add AC mains power. Newer devices other than cameras can also benefit from being provided power over installed coaxial cable, or alternatively being provided power over a pair of copper wires routed along with a fiber optic cable.

The injection of direct current (DC) power into an infrastructure that previously had no applications using this type of energy can have several unintended consequences if the DC current were to be arbitrarily applied to the coaxial cable or to the copper wires routed with a fiber optic cable. The first being damage to legacy equipment that may still be connected to the coaxial cable or fiber optic cable. Particularly true of coaxial cable, a second consideration is the coaxial cable at the remote end may also be unterminated with bare wire that could possibly arc and create a combustion source if the cable were to come in contact with a metallic object or some other electrical device.

In order to eliminate such possibilities, it is prudent to first determine that there is equipment at the remote end of the cable that can be positively identified (classified) as being able to operate with a DC current before the local equipment injects a DC current onto the coaxial cable or pair of wires routed with a fiber optic cable.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter.

Remote devices are classified or identified as devices configured to be powered by power injected onto a transmission medium such as a coaxial cable. From a local position, local classification circuitry applies a first low voltage direct current (DC) signal to the transmission medium. Energy from the first DC signal is received by remote classification circuitry at the remote position of a remote device, and stored within an energy storage component. Using the stored energy, the remote classification circuitry generates a digital classification signal on the coax cable or transmission medium. Upon receipt of the digital classification signal at the local end, the local classification circuitry responsively applies a second higher voltage DC signal to the transmission medium. The second DC signal is received at the remote end and used in providing power to the remote device.

Without limitation, one or more of the following features, in various combinations, can be present in exemplary embodiments.

In some exemplary embodiments, a method of classifying and interacting with remotely located equipment, coupled to a transmission medium through a media converter, is provided. The method can include: applying, from a local position a first DC signal to a transmission medium extending from the local position to a remote position of the remotely located equipment, the first DC signal being a low voltage and current limited signal having a first voltage; receiving the first DC signal over the transmission medium at the remote position and storing energy from the first DC signal in an energy storage component; generating a digital classification signal on the transmission medium, at the remote position, using a classification pulse generating circuit powered by the energy stored from the first DC signal, the digital classification signal identifying that the remotely located equipment is configured to operate as a powered device receiving power over the transmission medium; receiving the digital classification signal at the local position and responsively applying from the local position a second DC signal to the transmission medium, the second DC signal having a second voltage, higher than the first voltage; and receiving the second DC signal over the transmission medium at the remote position and providing power from the second DC signal to the remotely located equipment.

In some exemplary embodiments of a method of classifying and interacting with remotely located equipment, receiving the second DC signal over the transmission medium further comprises: sensing at the remote position a rise in voltage on the transmission medium from the first voltage; and responsive to the sensed rise in voltage, disconnecting and isolating the classification pulse generating circuit from the transmission medium.

In some exemplary embodiments of a method of classifying and interacting with remotely located equipment, the transmission medium is a coaxial cable, and applying from the local position the first DC signal to the transmission medium comprises applying the first DC signal to a center conductor of the coaxial cable.

In some exemplary embodiments of a method of classifying and interacting with remotely located equipment, generating the digital classification signal on the transmission medium using the classification pulse generating circuit comprises generating the digital classification signal by controllably shorting the center conductor of the coaxial cable to a shield outer conductor of the coaxial cable.

In some exemplary embodiments of a method of classifying and interacting with remotely located equipment, generating the digital classification signal on the transmission medium using the classification pulse generating circuit comprises generating a standardized set of pulses.

In some exemplary embodiments of a method of classifying and interacting with remotely located equipment, generating the standardized set of pulses comprises generating an encoded serial data stream.

In some exemplary embodiments of a method of classifying and interacting with remotely located equipment, providing power from the second DC signal to the remotely located equipment comprises using Power over Ethernet (PoE) circuitry of a twisted pair copper-to-coaxial media converter to provide power to the remotely located equipment.

In some exemplary embodiments of a method of classifying and interacting with remotely located equipment, the transmission medium is pair of copper wires routed with a fiber optic data cable.

In some exemplary embodiments, a classification system is provided for classifying and interacting with remotely located equipment coupled to a transmission medium through a media converter, the transmission medium extending from a local position to a remote position of the remotely located equipment. The classification system can include local classification circuitry at the local position, comprising: local switching circuitry configured to be coupled between a power source and the transmission medium; and local control circuitry configured to be coupled to the local switching circuitry and to the transmission medium. The local control circuitry can be further configured to: apply a first DC signal to the transmission medium, the first DC signal being a low voltage and current limited signal having a first voltage, the first voltage being no greater than 5 volts; monitor the transmission medium for a digital classification signal from the remote position generated in response to the first DC signal, the digital classification signal identifying that the remotely located equipment is configured to operate as a powered device receiving power over the transmission medium; and control the local switching circuitry, in response to receipt of the digital classification signal from the remote position, to apply a second DC signal to the transmission medium, the second DC signal being generated by the power source and having a second voltage, the second voltage being between 44 volts and 57 volts.

In some exemplary embodiments of a classification system, the local switching circuitry is configured to limit a slew rate of an increase in voltage on the transmission medium from the first voltage to the second voltage.

In some exemplary embodiments of a classification system, the local control circuitry includes current and voltage monitoring circuitry configured to monitor voltage and current on the transmission medium for fault conditions, and the local control circuitry is further configured to control the local switching circuitry to disconnect the power source from the transmission medium in response to detected fault conditions.

In some exemplary embodiments of a classification system, the local control circuitry comprises a microcontroller configured to apply the first DC signal, monitor the transmission medium for a digital classification signal, monitor voltage and current on the transmission medium for fault conditions, and control the local switching circuitry.

In some exemplary embodiments of a classification system, the classification system further includes remote classification circuitry at the remote position. The remote classification circuitry can comprise an energy storage component configured to be coupled to the transmission medium, to receive the first DC signal over the transmission medium at the remote position, and to store energy from the first DC signal; a classification pulse generating circuit coupled to the energy storage component and configured to be powered by the energy stored from the first DC signal, the classification pulse generating circuit further configured to generate the digital classification signal identifying that the remotely located equipment is configured to operate as a powered device receiving power over the transmission medium; and isolation circuitry coupled to the transmission medium and to the classification pulse generating circuitry, the isolation circuitry configured to sense a rise in voltage on the transmission medium from the first voltage and to responsively isolate the classification pulse generating circuitry from the transmission medium.

In some exemplary embodiments of a classification system, the transmission medium is a coaxial cable; the local control circuitry is configured to apply the first DC signal to the transmission medium by applying the first DC signal to a center conductor of the coaxial cable; and the classification pulse generating circuit is configured to generate the digital classification signal on the transmission medium by controllably shorting the center conductor of the coaxial cable to a shield outer conductor of the coaxial cable.

In some exemplary embodiments of a classification system, the classification pulse generating circuit is configured to generate the digital classification signal on the transmission medium by generating a standardized set of pulses.

In some exemplary embodiments of a classification system, the classification pulse generating circuit is configured to generate the digital classification signal on the transmission medium by generating an encoded serial data stream.

In some exemplary embodiments of a classification system, the remote classification circuitry further comprises remote switching circuitry configured to selectively couple the transmission medium and the second DC signal having the second voltage to remote device power circuitry.

In some exemplary embodiments of a classification system, the remote device powering circuitry includes PoE circuitry coupled to the remote device through an

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," "coupled" and variations thereof are used broadly and encompass both direct and indirect connections and couplings. Further, "connected" and "coupled" are not restricted to physical or mechanical connections or couplings.

Disclosed embodiments include classification systems, circuits and methods for classifying and interacting with remotely located equipment coupled to a transmission medium, such as a coaxial cable or a fiber optic cable having a pair of power conducting wires routed therewith. The disclosed methods, systems and circuits are beneficial in identifying whether the remote equipment is of a type which is able to operate with direct current (DC) provided over the transmission medium before the local equipment injects a DC current onto the transmission medium. This allows security cameras or other remote devices to be upgraded to types which are designed to receive power through a transmission medium, for example using Power-over-Ethernet (PoE) or other technologies, while continuing to use existing installed infrastructure. The disclosed classification methods, systems and circuits provide the benefit of an installer being able to upgrade devices and equipment without the need for an electrician to also move or add AC mains power, while at the same time preventing the unintended consequences of applying the DC current to the transmission medium in instances in which the legacy equipment is still connected to the transmission medium. Thus, disclosed embodiments can prevent damage of legacy equipment, arcing of bare wire, etc.

Figure 1:
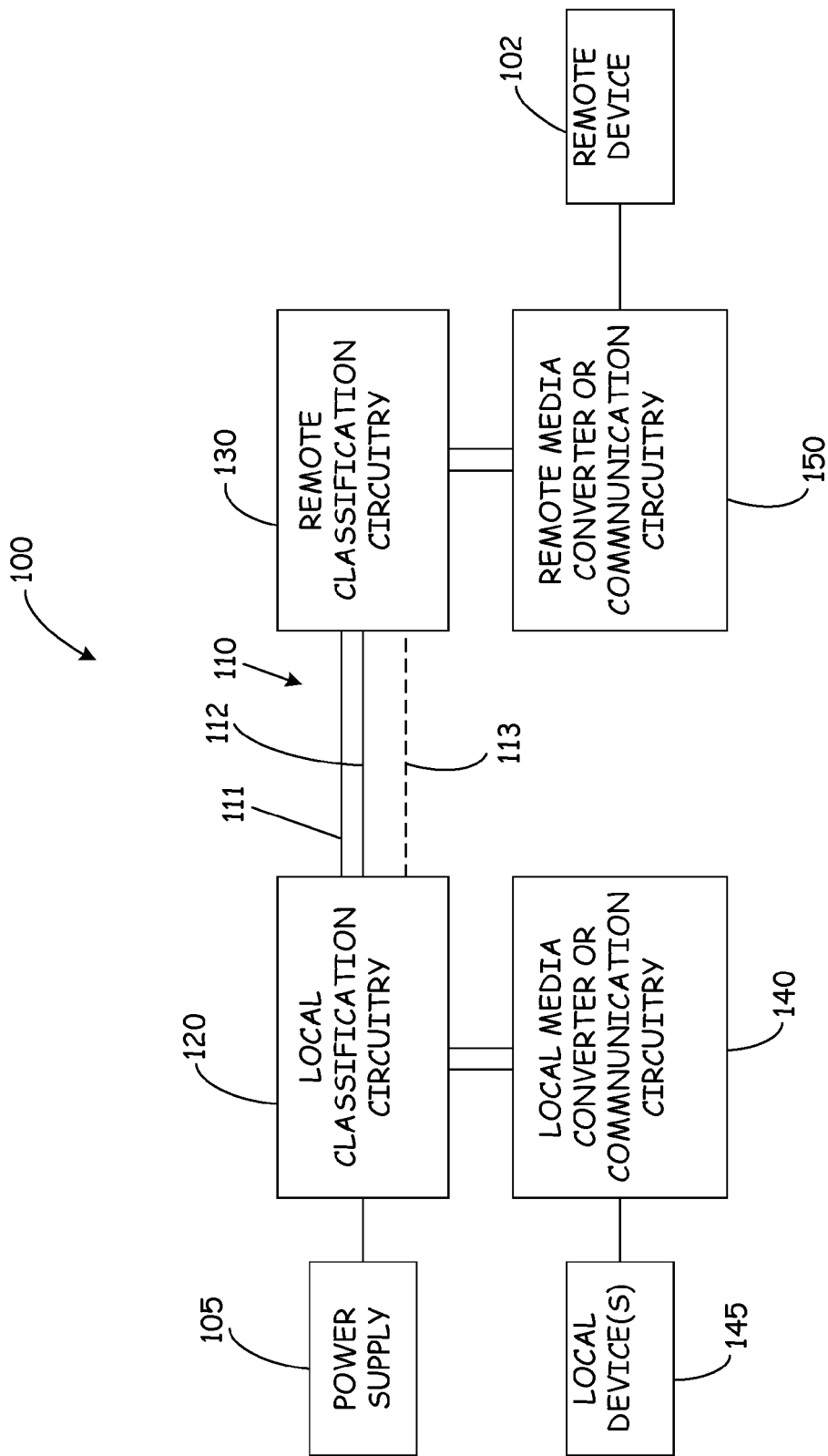
FIG. 1 is a block diagram illustrating a first exemplary embodiment of a classification system.

Referring now to FIG. 1, shown is a classification system 100 for use in classifying a remote device 102 to identify that the remote device 102 is configured to operate as a powered device receiving power from a power supply 105 over a communication or transmission medium 110. In various embodiments, classification system 100 can be considered to include either one of local classification circuitry 120 and remote classification circuitry 130. Alternatively, classification system 100 can be considered to include both of local classification circuitry 120 and remote classification circuitry 130. While embodiments of classification system 100 and disclosed methods are described in the context of interactions between local classification circuitry 120 and remote classification circuitry 130, it must be noted that not all embodiments require both of local classification circuitry 120 and remote classification circuitry 130. Instead, embodiments can be directed toward either one of these local and remote classification circuitries, which would interact with the other of the local and remote classification circuitries.

In various embodiments, transmission medium 110 can take different forms. In an exemplary embodiment, transmission medium 110 is a coaxial cable having a center conductor 111 and an outer shield 112. However, while exemplary embodiments are described with reference to transmission medium 110 being a coaxial cable, it must be noted that such descriptions do not limit transmission medium 110 to a coaxial cable. For example, in other embodiments, transmission medium 110 can be a pair of power conducting wires 111 and 112 which are routed with a fiber optic cable 113. In these embodiments, fiber optic cable 113 provides data communications, while the pair of conductive wires provides power for powering remote device 102. Fiber optic cable 113 is shown in dashed line as being optional since the fiber optic cable would not be installed in all embodiments (e.g., in coaxial cable embodiments).

Also shown in FIG. 1 are the local device(s) 145, which can be computers, mobile devices, monitors, or other types of devices. Local devices 145 can communicate through local communication circuitry 140, such as media conversion circuitry, transmission medium 110, and remote communication circuitry 150 in order to communicate with or access remote device 102. In some embodiments, local classification circuitry 120 can be integrated with the local media converter or communication circuitry 140. Likewise, in some embodiments, the remote classification circuitry 130 can be integrated with remote communication circuitry or media converter 150.

Prior to injecting power from power supply 105 onto transmission medium 110, local classification circuitry 120 communicates with remote classification circuitry 130 to identify whether remote device 102 is a device which is configured to operate as a powered device (receiving power over the transmission medium). Thereafter, local classification circuitry 120 injects power from power supply 105 onto transmission medium 110 for this purpose. Local classification circuitry 120 also monitors the voltage, current and/or power from the DC signal injected onto transmission medium 110 in order to detect any fault conditions, and in the event of a fault condition, disconnects power supply 105 from transmission medium 110.

In exemplary embodiments of the present disclosure, local classification circuitry 120 applies a first DC signal having a first voltage $V_1$ to a local end of the transmission medium 110. For example, in embodiments in which the transmission medium is a coaxial cable, the local classification circuitry can apply the first DC signal by applying the first DC signal to center conductor 111 of the coaxial cable. The first DC signal is a low voltage, current limited power source signal. For example, the first voltage $V_1$ will typically be 5 volts or less. In one embodiment, first voltage $V_1$ of the first DC signal is 3.3 volts and is current limited to 1 mA. Such a value is deemed safe for legacy equipment, such as analog cameras or 50 ohm termination impedance devices installed at the remote end to not damage these devices. However, such a combination of low voltage and current is capable of charging a small capacitor or energy accumulating reservoir in a relatively short period of time.

In the various embodiments, in the remote classification circuitry 130 such an energy accumulating reservoir or capacitor is included and is coupled to the transmission medium 110 to receive energy from the first low voltage signal. In the various embodiments, when the remote end capacitor or reservoir has accumulated enough energy, a digital circuit in the remote classification circuitry 130 is initialized and begins to generate a digital classification signal on the transmission medium. For example, for a coaxial cable communication or transmission medium, the remote classification circuitry can generate the digital classification signal by shorting the coaxial cable center conductor 111 to its shield outer conductor 112 to generate pulses. The shorted cable pulses will then be sensed by the local end circuitry 120 that is injecting the low voltage power. The digital classification signal is generated with pulse durations such that shorting of the coaxial cable at the remote end does not cause the energy in the energy accumulating reservoir to be immediately depleted. In various embodiments, the shorting of the coaxial cable at the remote end can be controlled to generate a standardized set of pulses so that the local end can discriminate the shorting pulses from noise that could be generated by the remote end of the cable from some other type of equipment or operating condition. The pulses alternatively could be in the form of an encoded serial data stream. For example, the pulses could be generated to transmit ASCII text strings with information regarding the remote device 102 or the remote classification circuitry 130, such as serial number information, model number information, specification information, etc.

Once the local classification circuitry 120 has positively identified that all equipment at the remote end is capable of operating as a powered device, the circuitry 120 then applies a higher voltage power supply signal to the coaxial cable or other transmission medium 110. For example, the local classification circuitry 120 will then apply a second voltage signal, from power supply 105, having a second higher voltage $V_2$. In one example embodiment, the second higher voltage $V_2$ can be 57 volts, but other voltages can be used as well. In the various embodiments, the rise time of the applied second voltage signal on the transmission medium 110 is voltage limited by switching circuitry to provide slew rate control so as to limit the peak current conducted through the coaxial cable or other transmission medium to a low enough level as to prevent resetting of power circuits, microcontrollers, and other components used elsewhere in the system.

In some embodiments, the control circuitry of the local classification circuit 120 monitors both voltage and current on the transmission medium to make certain that the applied power is within predetermined acceptable limits and monitors for fault conditions such as a short circuit or an over/under voltage condition. If a fault is detected, local classification circuitry 120 can remove the injected power from the coaxial cable or other transmission medium. After waiting some predetermined length of time, the local classification circuitry can then again try to classify the remote device 102 and transmission medium 110.

Further, in some exemplary embodiments, when the low voltage power from the first voltage signal is first applied to the transmission medium by the local classification circuitry 120, if after a period of time no pulses from the remote classification circuitry are detected, the local classification circuitry will remove the low voltage power signal from the transmission medium and wait some predetermined period of time before attempting the classification process again. This process can continue indefinitely until a positive indication of the remote device has been detected.

In some exemplary embodiments, with the second DC signal from power supply 105 is applied on transmission medium 110, remote classification circuitry 130 is configured to sense the rise in voltage from the lower voltage of the first DC signal, and then to disconnect and isolate the classification pulse generation circuits from the higher voltages. Then, as the voltage on the transmission medium continues to rise, the remote classification circuitry senses when the voltage is above some threshold voltage, for example 26 volts, and responsively connects the applied power from the transmission medium to power management circuitry in the remote classification circuitry or in remote media converter or communication circuitry 150. In some embodiments, the remote classification circuitry 130 can also monitor current and voltage on the transmission medium 110, and can report back or otherwise identify fault conditions, operational states, etc.

In some embodiments, in both the local classification circuitry 120 and the remote classification circuitry 130, passive low pass filter circuitry is included to allow DC signals to pass through, while at the same time causing the power supply 105, which normally presents a very low or near zero impedance, to look to the remainder of the circuit as a higher impedance (e.g., 2 KOhm) on the transmission medium at the frequency band of interest to the data path circuits. This impedance transformation can be necessary in some embodiments so that data circuit elements will not be excessively loaded by the power supply impedance. Also, in some embodiments, both the local classification circuitry and the remote classification circuitry include a DC blocking capacitor used to prevent the DC voltage and current from damaging the data path signal coupling magnetic circuits which can be included within local media converter 140 and remote media converter 150.

Figure 2:
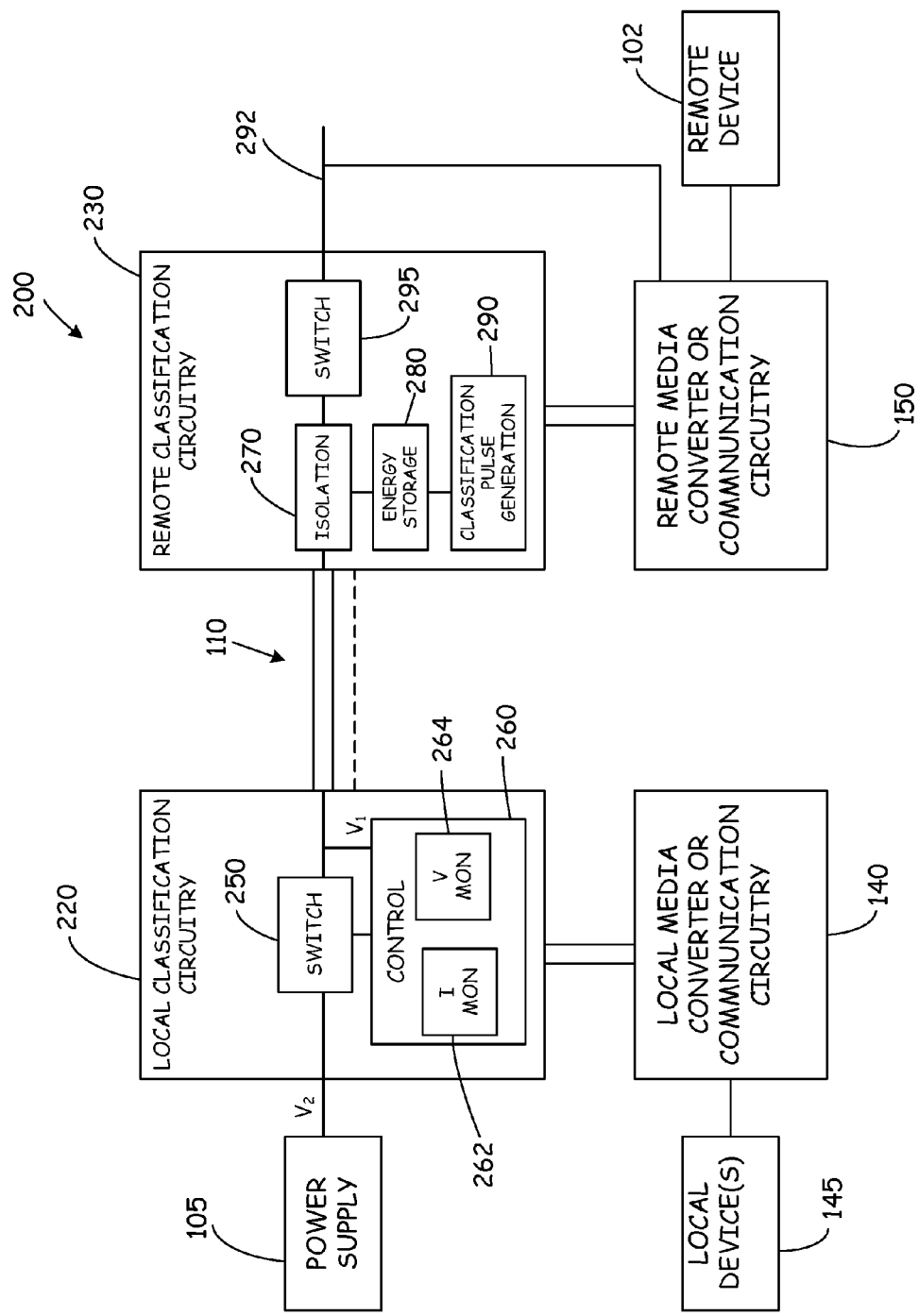
FIG. 2 is a block diagram illustrating another exemplary embodiment of a classification system such as shown in FIG. 1.

Referring now to FIG. 2, shown is classification system 200 which is a first more particular embodiment of classification system 100 shown in FIG. 1. Classification system 200 is first described with reference to local classification circuitry 220. Then, classification system 200 is described with reference to remote classification circuitry 230 and the interaction between the local and remote classification circuitries. It must be understood that embodiments of the classification system can be considered with respect to either one of local and remote classification circuitries 220 and 230, or both combined.

As shown in FIG. 2, local classification circuitry 220 includes switching circuitry 250 and control circuitry 260. Switching circuitry 250 can be a switch controlled by control circuitry 260 to selectively provide the second voltage signal from power supply 105 to transmission medium 110, while limiting the slew rate of the voltage and current increase on the transmission medium as described above. Local control circuitry 260 can include a microcontroller, a circuit with discrete components, a system on a chip, or other devices configured to be coupled to switching circuitry 250 and to the transmission medium 110 to perform control and monitoring functions. As such, control circuitry 260 is configured to generate and apply a first DC signal, having the voltage $V_1$, to the transmission medium 110. As noted above, the first DC signal is a low voltage and current limited signal, with the first voltage $V_1$ being no greater than 5 volts, and typically around 3.3 volts.

Control circuitry 260 is also configured to monitor transmission medium 110 for a digital classification signal returned from the remote position and generated in response to the first DC signal from local classification circuitry 220. The digital classification signal identifies that the remotely located equipment 102 is configured to be operated as a powered device receiving power over the transmission medium, as discussed above. Control circuitry 260 is also configured to control the switching circuitry 250, in response to receiving the digital classification signal from the remote position, to apply a second DC signal, having the higher voltage $V_2$, to the transmission medium. The second DC signal is of a sufficiently higher voltage and current to provide power for use by remote device 102, remote media converter or communication circuitry 150, and/or remote classification circuitry 230. In some embodiments, the second voltage $V_2$ is between 44 volts and 57 volts.

As also shown in FIG. 2, control circuitry 260 includes, in some embodiments, current monitoring circuitry 262 and voltage monitoring circuitry 264 which are configured to monitor voltage and current on the transmission medium 110 for fault conditions. The current and voltage monitoring can be performed using analog-to-digital (A/D) circuitry within a microcontroller or implemented using separate A/D devices. Also, current monitoring circuitry 262 can include separate circuitry which converts a current into a voltage signal. Control circuitry 260 is further configured to control the switching circuitry 250 to disconnect the power source 105 from the transmission medium 110 in response to detected fault conditions.

As shown in FIG. 2, remote classification circuitry 230 includes, in some embodiments, isolation circuitry 270, energy storage component 280, classification pulse generation circuitry 290 and switch 295. Energy storage component 280 is configured to be coupled to transmission medium 110, for example through isolation circuitry 270 or otherwise, to receive the first DC signal (e.g. having a voltage $V_1$ of 3.3 volts), and to store energy from the first DC signal. Classification pulse generating circuit 290 is coupled to energy storage component 280 and is configured to be powered by the energy stored from the first DC signal. In some embodiments, classification pulse generation circuit 290 includes a microcontroller which is initialized once a voltage from energy storage component 280 reaches a minimum initialization voltage for powering the controller. In other embodiments, classification pulse generating circuit 290 can be other discrete components, microcontrollers, square wave generators, etc. which are powered by energy stored in component 280. As discussed above, classification pulse generation circuit 290 is configured to generate the digital classification signal identifying that the remotely located equipment 102 is configured to operate as a powered device receiving power over the transmission medium. The digital classification signal is transmitted back across transmission medium 110, for example through isolation circuitry 270 or otherwise, to inform control circuitry 260 in the local classification circuit that remote device 102 is a device configured to be powered over the transmission medium. As discussed above, the classification pulse generation circuit 290 can generate the digital classification signal, in instances where transmission medium 110 is a coaxial cable, by shorting the center conductor of the coaxial cable to the shield outer conductor of the coaxial cable.

Isolation circuitry 270 is coupled to the transmission medium 110 and the classification pulse generating circuitry 290 and is configured to sense a rise in voltage on the transmission medium from the first voltage and to responsively isolate the classification pulse generating circuitry 290 and the energy storage component 280 from the transmission medium and the increasing voltage and current. Under control of isolation circuitry 270, classification pulse generation circuitry 290 or other control circuitry, switching circuitry 295 is configured to selectively couple the transmission medium and the second DC signal to remote media converter or communication circuitry 150 to provide power for remote device 102. As discussed above, while isolation circuitry 270 isolates classification pulse generating circuitry 290 from the increasing voltage on transmission medium 110, in some embodiments, switch 295 does not couple the transmission medium and the second DC signal to the remote media converter or communication circuitry 150 until some predetermined voltage between voltage $V_1$ and voltage $V_2$ is reached. In some exemplary embodiments, remote media converter or communication circuitry 150 includes Power over Ethernet (PoE) circuitry to power remote device 102 through an Ethernet connection.

Figure 3:
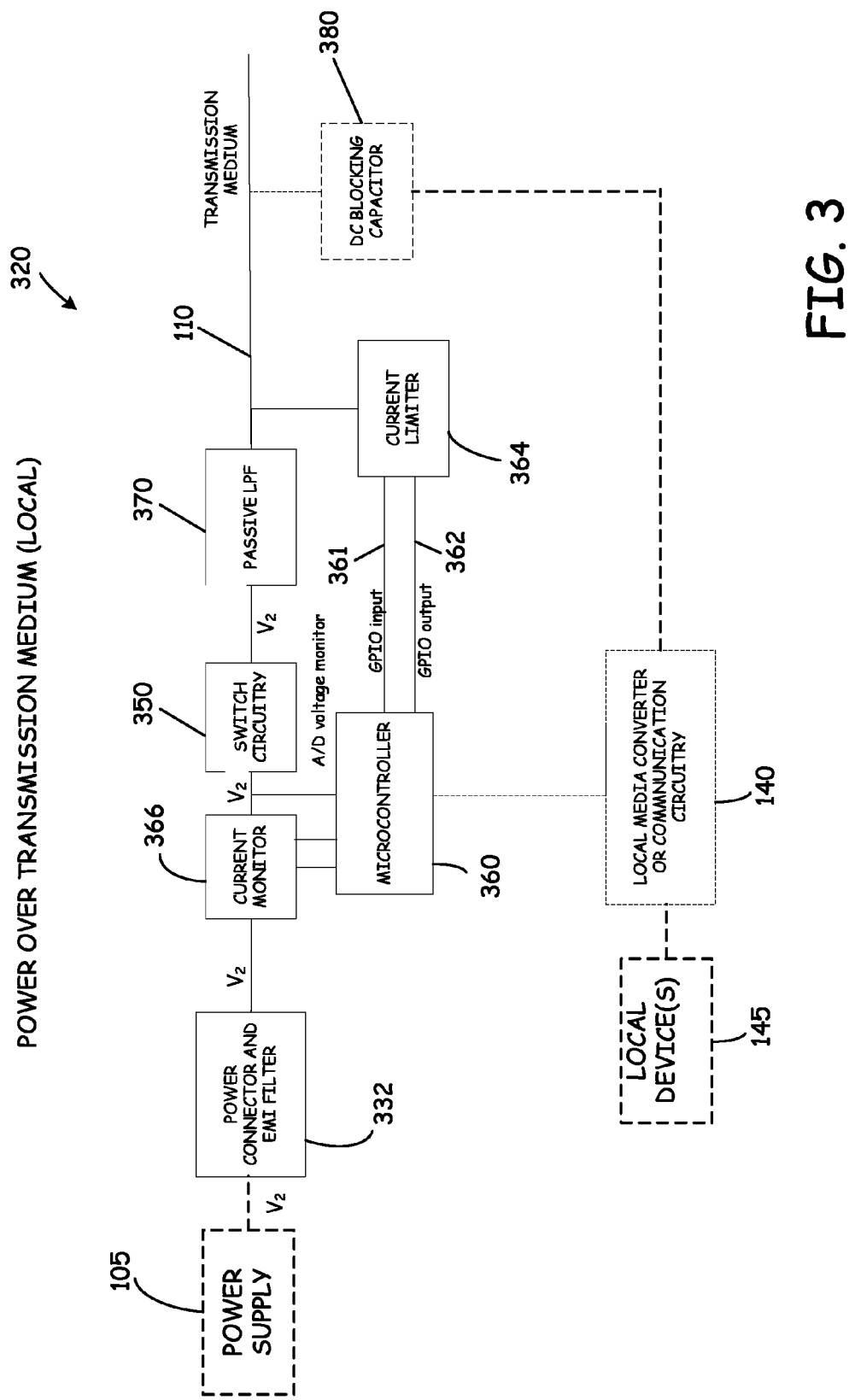
FIG. 3 is a block diagram illustrating an exemplary embodiment of local classification circuitry such as illustrated in FIGS. 1 and 2.
Figure 4:
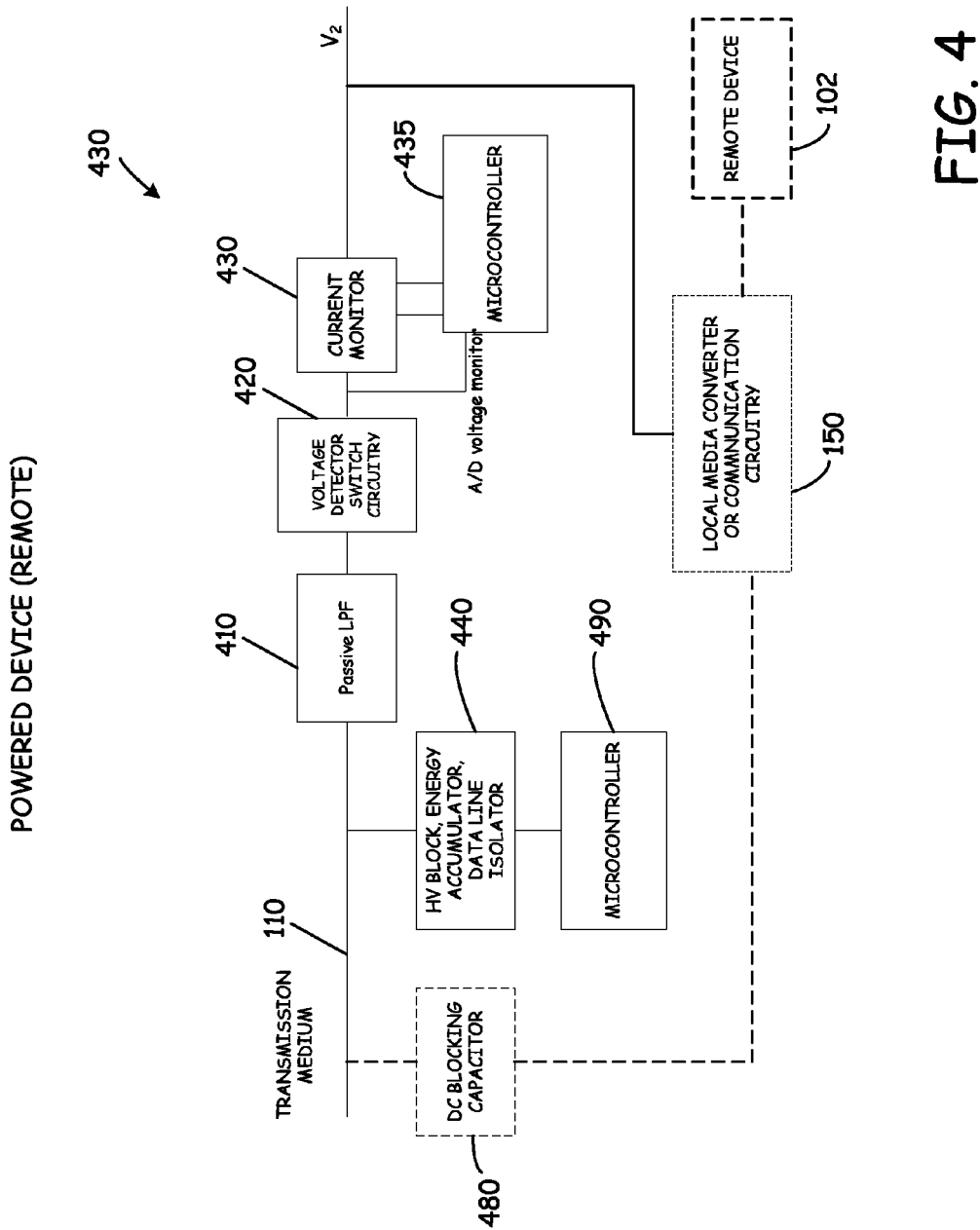
FIG. 4 is a block diagram illustrating an exemplary embodiment of remote classification circuitry such as illustrated in FIGS. 1 and 2.

Referring now to FIGS. 3 and 4, shown are more detailed example embodiments of local classification circuitry and remote classification circuitry as shown in FIGS. 1 and 2. In FIGS. 3 and 4, components or elements shown in dashed lines need not be included in the corresponding classification circuits 320 and 430. Instead, these elements or components can be, as described above, circuits or devices with which the classification circuitry works.

As shown in FIG. 3, local classification circuit 320 includes, in some embodiments, a power connector and EMI filter 332 configured to be connected to power supply 105. A microcontroller 360, configured with software or firmware is included to perform the control functions described above. For example, microcontroller 360 generates the first DC signal on output 362, and receives the classification signal from the transmission medium on input 361. A current limiter 364 is included between microcontroller 360 and transmission medium 110 to limit the current on transmission medium 110 from the first voltage signal when the classification process begins.

After receiving the digital classification signal on transmission medium 110 at input 361, microcontroller 360 causes switching circuitry 350 to connect the second voltage signal from power supply 105 to the transmission medium. A current monitor 366 is included in circuit 320 to provide current dependent voltages to microcontroller 360 such that the microcontroller can monitor the current on transmission medium 110. Likewise, a voltage input between transmission medium 110 and microcontroller 360 is included such that the microcontroller 360 can monitor voltage on transmission medium 110. With voltage and current monitoring inputs, microcontroller 360 can also monitor power transmission across transmission medium 110, and can detect fault conditions. In response to fault conditions, microcontroller 360 is configured to control switch circuitry 350 to disconnect power supply 105 and the second DC signal from the transmission medium 110.

Also as discussed above, a passive low pass filter 370 is included in some embodiments to increase the impedance presented by local classification circuit 320 and power supply 105 on transmission medium 110. For communication of data across transmission medium 110, a DC blocking capacitor 380 is shown coupled between the local media converter or communication circuitry 140 and the transmission medium. However, the DC blocking capacitor need not be considered a component of circuit 320.

A shown in FIG. 4, remote classification circuit 430 includes, in one example embodiment, energy accumulating and data line isolating circuitry 440 and microcontroller 490 to perform the functions described above. In this example embodiment, circuitry 440 includes a storage capacitor which stores energy from the first DC signal when received over the transmission medium, and also includes high voltage blocking and data line isolating circuitry which isolate the microcontroller 490 from the transmission medium when the voltage increases from the first DC signal voltage to the higher voltage of the second DC signal.

Microcontroller 490 is initialized when the voltage within the energy accumulator surpasses some minimum supply voltage. Thereafter, microcontroller 490 is powered by stored energy and generates the digital classification signal which is provided through circuitry 440 to the transmission medium. As discussed above, the configuration of microcontroller 490 can be such that the digital classification signal, which identifies that the remotely located equipment is configured to operate as a powered device, is generated as a standardized set of pulses. For example, microcontroller 490 can be in the form of a square wave generator. In the alternative, microcontroller 490 can be configured to generate the digital classification signal such that the signal is in the form of an encoded serial data stream with data indicative of information such as serial numbers, specifications, operating parameters, etc.

Also shown in FIG. 4, in some embodiments, remote classification circuitry 430 includes a passive low pass filter 410 and a voltage detecting switch circuit 420. Low pass filter 410 aids in the impedance design of the system, passing the filtered second DC signal to switching circuitry 420. Switching circuitry 420 detects when the voltage on transmission medium 110 has risen to a sufficient voltage (between voltage $V_1$ and voltage $V_2$) before connecting the transmission medium 110 and second DC signal to the local media converter or communication circuitry 150 for use in providing power to remote device 102. If desired, a second microcontroller 435 and a current monitor 430 can be included to allow monitoring of current, voltage and power as is performed by the local classification circuit 320. While such monitoring is not used for control in all embodiments, it can be used beneficially to report operational conditions, for example by transmitting this information back through transmission medium 110. It must be noted that current monitor 430 and microcontroller 435 are not required in all such embodiments. Further, microcontroller 435 and microcontroller 490 can be combined such that only a single microcontroller is used. Further still, either or both of microcontrollers 435 and 490 can be shared with microcontrollers within local media converter or communication circuitry 150, or other associated circuitry.

Figure 5:
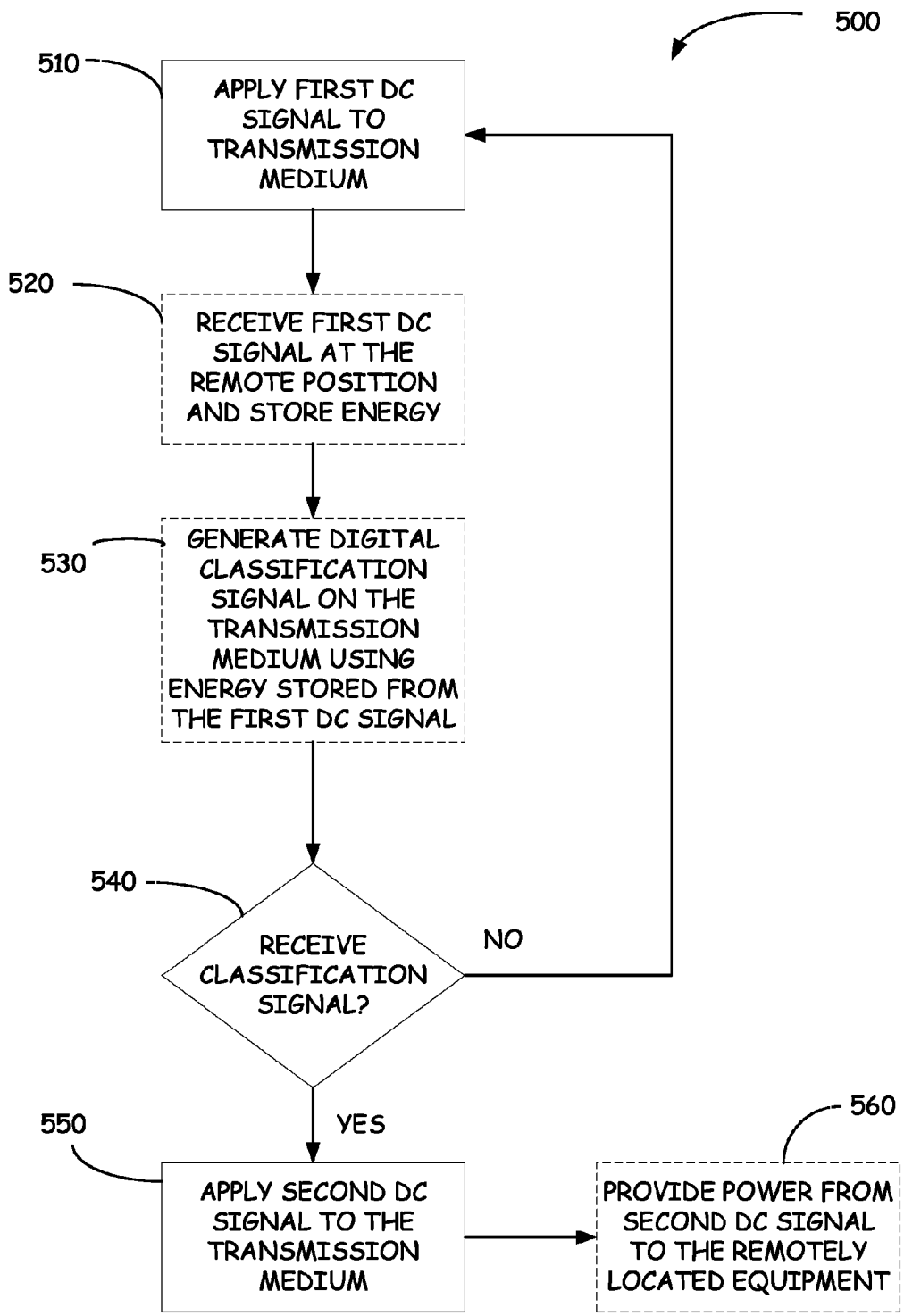
FIG. 5 is a flow diagram illustrating exemplary method embodiments.

Referring now to FIG. 5, shown is a flow diagram 500 illustrating a method of classifying and interacting with remotely located equipment coupled to a transmission medium through a media converter. Steps of the method performed by local classification circuitry are illustrated in solid lines, while steps performed by remote classification circuitry are illustrated in dashed lines. As such, flow diagram 500 can also be considered to illustrate separate methods performed or implemented in the respectively local and remote classification circuitries.

As shown at block 510, a method includes applying, from a local position, a first DC signal to a transmission medium extending from the local position to a remote position of the remotely located equipment. As discussed above, the first DC signal is a low voltage and current limited signal having a first voltage V1. Next, at block 520, the first DC signal is received over the transmission medium at the remote position, and energy from the first DC signal is stored in an energy storage component.

At block 530, a digital classification signal is generated on the transmission medium, at the remote position, using a classification pulse generating circuit powered by the energy stored from the first DC signal. As discussed above, the digital classification signal identifies that the remotely located equipment is configured to operate as a powered device receiving power over the transmission medium. As in some embodiments described above, generation of the digital classification signal can occur after classification pulse generating circuitry, for example in the form of a suitably configured microcontroller, is initialized in response to a voltage of the energy storage component reaching a predetermined minimum supply voltage level.

At decision 540, a determination is made as to whether the digital classification signal has been received at the local position. If it is determined that the digital classification signal has not been received at the local position, the process repeats (e.g., after a predetermined time period) and the first DC signal is applied to the transmission medium in an attempt to receive the digital classification signal in response. If the digital classification signal is determined to have been received, responsively the second DC signal is applied at block 550 from the local position to the transmission medium. As discussed above, the second DC signal has a second voltage, higher than the first voltage, sufficient to power a remote device such as a camera. At block 560, power from the second DC signal is received over the transmission medium at the remote position and provided to the remotely located equipment.

These and other method steps can be implemented as described above with reference to the systems and circuits illustrated in FIGS. 1-4.

Although the present invention has been described with reference to preferred embodiments, workers skilled in the art will recognize that changes may be made in form and detail without departing from the spirit and scope of the invention.

What is claimed is:

1. A method of classifying and interacting with remotely located equipment coupled to a transmission medium through a media converter, the method comprising:
    applying from a local position a first direct current (DC) signal to a transmission medium extending from the local position to a remote position of the remotely located equipment, the first DC signal being a low voltage and current limited signal having a first voltage;
    receiving the first DC signal over the transmission medium at the remote position and storing energy from the first DC signal in an energy storage component;
    generating a digital classification signal on the transmission medium, at the remote position, using a classification pulse generating circuit powered by the energy stored from the first DC signal, the digital classification signal identifying that the remotely located equipment is configured to operate as a powered device receiving power over the transmission medium;
    receiving the digital classification signal at the local position and responsively applying from the local position a second DC signal to the transmission medium, the second DC signal having a second voltage, higher than the first voltage;
    receiving the second DC signal over the transmission medium at the remote position and providing power from the second DC signal to the remotely located equipment.

2. The method of claim 1, wherein receiving the second DC signal over the transmission medium further comprises:
    sensing at the remote position a rise in voltage on the transmission medium from the first voltage; and
    responsive to the sensed rise in voltage, disconnecting and isolating the classification pulse generating circuit from the transmission medium.

3. The method of claim 1, wherein the transmission medium is a coaxial cable, and wherein applying from the local position the first DC signal to the transmission medium comprises applying the first DC signal to a center conductor of the coaxial cable.

4. The method of claim 3, generating the digital classification signal on the transmission medium using the classification pulse generating circuit comprises generating the digital classification signal by controllably shorting the center conductor of the coaxial cable to a shield outer conductor of the coaxial cable.

5. The method of claim 1, wherein generating the digital classification signal on the transmission medium using the classification pulse generating circuit comprises generating a standardized set of pulses.

6. The method of claim 5, wherein generating the standardized set of pulses comprise an encoded serial data stream.

7. The method of claim 1, wherein providing power from the second DC signal to the remotely located equipment comprises using Power over Ethernet (PoE) circuitry of a twisted pair copper-to-coaxial media converter to provide power to the remotely located equipment.

8. The method of claim 1, wherein the transmission medium is pair of copper wires routed with a fiber optic data cable.

9. A classification system for classifying and interacting with remotely located equipment coupled to a transmission medium through a media converter, the transmission medium extending from a local position to a remote position of the remotely located equipment, the classification system comprising:

local classification circuitry at the local position, comprising:
local switching circuitry configured to be coupled between a power source and the transmission medium; and
local control circuitry configured to be coupled to the local switching circuitry and to the transmission medium, the local control circuitry further configured to:
apply a first direct current (DC) signal to the transmission medium, the first DC signal being a low voltage and current limited signal having a first voltage, the first voltage being no greater than 5 volts;
monitor the transmission medium for a digital classification signal from the remote position generated in response to the first DC signal, the digital classification signal identifying that the remotely located equipment is configured to operate as a powered device receiving power over the transmission medium;
control the local switching circuitry, in response to receipt of the digital classification signal from the remote position, to apply a second DC signal to the transmission medium, the second DC signal being generated by the power source and having a second voltage, the second voltage being between 44 volts and 57 volts.

10. The classification system of claim 9, wherein the local switching circuitry is configured to limit a slew rate of an increase in voltage on the transmission medium from the first voltage to the second voltage.

11. The classification system of claim 9, wherein the local control circuitry includes current and voltage monitoring circuitry configured to monitor voltage and current on the transmission medium for fault conditions, and wherein the local control circuitry is further configured to control the local switching circuitry to disconnect the power source from the transmission medium in response to detected fault conditions.

12. The classification system of claim 11, wherein the local control circuitry comprises a microcontroller configured to apply the first DC signal, monitor the transmission medium for a digital classification signal, monitor voltage and current on the transmission medium for fault conditions, and control the local switching circuitry.

13. The classification system of claim 9, and further comprising:
remote classification circuitry at the remote position, comprising:
an energy storage component configured to be coupled to the transmission medium, to receive the first DC signal over the transmission medium at the remote position, and to store energy from the first DC signal;
a classification pulse generating circuit coupled to the energy storage component and configured to be powered by the energy stored from the first DC signal, the classification pulse generating circuit further configured to generate the digital classification signal identifying that the remotely located equipment is configured to operate as a powered device receiving power over the transmission medium; and
isolation circuitry coupled to the transmission medium and to the classification pulse generating circuitry, the isolation circuitry configured to sense a rise in voltage on the transmission medium from the first voltage and to responsively isolate the classification pulse generating circuitry from the transmission medium.

14. The classification system of claim 13, wherein the transmission medium is a coaxial cable, and wherein:
the local control circuitry is configured to apply the first DC signal to the transmission medium by applying the first DC signal to a center conductor of the coaxial cable; and
the classification pulse generating circuit is configured to generate the digital classification signal on the transmission medium by controllably shorting the center conductor of the coaxial cable to a shield outer conductor of the coaxial cable.

15. The classification system of claim 13, wherein the classification pulse generating circuit is configured to generate the digital classification signal on the transmission medium by generating a standardized set of pulses.

16. The classification system of claim 13, wherein the classification pulse generating circuit is configured to generate the digital classification signal on the transmission medium by generating an encoded serial data stream.

17. The classification system of claim 13, wherein the remote classification circuitry further comprises remote switching circuitry configured to selectively couple the transmission medium and the second DC signal having the second voltage to remote device power circuitry.

18. The classification system of claim 17, wherein the remote device powering circuitry includes Power over Ethernet (PoE) circuitry coupled to the remote device through an Ethernet connection.

* * * * *